United States Patent Office 3,373,213
Patented Mar. 12, 1968

3,373,213
PROCESS FOR DEHYDROGENATING
HYDROCARBONS
Israel S. Pasternak and Mohan Vadekar, Sarnia, Ontario,
Canada, and Choo Seng Giam, Irvine, Calif., assignors
to Esso Research and Engineering Company, a corporation of Delaware
No Drawing. Filed July 29, 1965, Ser. No. 475,884
18 Claims. (Cl. 260—666)

This invention relates to a process for the dehydrogenation of organic compounds. More particularly, this invention is concerned with a catalytic vapor phase dehydrogenation of organic compounds in the presence of oxygen, hydrogen sulfide and a halogen containing compound.

Co-pending commonly assigned U.S. patent application, S.N. 443,683, filed Mar. 25, 1965, describes a process wherein an organic feedstock, oxygen and hydrogen sulfide are reacted in the vapor phase in the presence of a catalyst to produce a reaction product more highly unsaturated than the organic feedstock. It is an object of this invention to provide an improved dehydrogenation process resulting in improved selectivities and yields over those described in the copending application.

In accordance with the present invention, an organic feedstock, oxygen, hydrogen sulfide and a halogen containing compound are reacted in the vapor phase in the presence of a catalyst to produce a reaction product more highly unsaturated than the feedstock.

In the co-pending application, it was pointed out that a reactive sulfur species such as $S_2$, SH or possibly $S_1$ was believed to be responsible for the dehydrogenation reaction and that such species are obtained after a proper selection of reaction conditions in accordance with the following equations:

$$H_2S + \tfrac{1}{2} O_2 \rightarrow H_2O + S$$

$$2H_2S + SO_2 \rightarrow 2H_2O + 3S$$

The addtiion of a halogen or hydrogen halide to the above-described reaction system is believed to be capable of increasing the concentration of the active sulfur species, thereby increasing the yields and selectivities of the subsequent dehydrogenation reaction, in accordance with the following equations:

$$2HX + \tfrac{1}{2} O_2 \rightarrow X_2 + H_2O$$

$$H_2S + X_2 \rightarrow 2HX + S$$

The reactive sulfur species formed in situ thereafter reacts with the organic feed to be dehydrogenated in accordance with the following illustrative equations:

$$S + RCH_2CH_3 \rightarrow RCHCH_2 + H_2S$$

$$X_2 + RCH_2CH_3 \rightarrow RCHCH_2 + 2HX$$

A wide variety of organic feedstocks may be dehydrogenated by the process of this invention. The feeds may be either hydrocarbon or substituted hydrocarbon materials having from 2 to 20 carbon atoms, preferably 2 to 8 carbon atoms, containing at least one

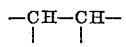

group. The hydrocarbon feeds include saturated or unsaturated alkyl, cycloalkyl and alkylaryl compounds possessing the above-defined structure. The substituted hydrocarbons which may be employed in the process of this invention include compounds containing halogen, oxygen, nitrogen or sulfur in addition to carbon and hydrogen. Typical examples of this latter class of compounds are acids, esters, ethers, ketones, aldehydes, nitriles, alkyl halides, cycloalkyl halides, alkylaryl halides, etc. Two of the preferred classes of feedstocks for the process of this invention are lower alkane and alkenes, such as butane, butene, isopentane, isopentene which are converted to more highly unsaturated products such as monoenes and dienes respectively. In another preferred embodiment, the process is applied to an alkyl aromatic feed such as ethylbenzene and styrene is recovered as a reaction product. In yet another preferred embodiment, the process of this invention is applied to $C_6$ to $C_8$ alkane or alkene feeds, for example hexane or hexene, to produce the corresponding cyclic and/or aromatic compounds via dehydrocyclization. Other typical feedstocks for the process are propionaldehyde, propionitrile, methylisobutyrate, ethylpyridine, ethyltoluene, alkylchlorobenzene, ethylnaphthylene, butylchloride, ethylchloride, methylethyl ketone, etc.

By proper adjustment of reaction conditions, the process of this invention may also be employed so as to simultaneously accomplish dimerization and dehydrogenation. Thus, propylene may be converted to benzene and isobutylene to xylenes by the process of this invention. It should be noted, however, that the reaction is highly exothermic and the temperature buildup in the catalyst bed may consume the desired product via cracking and burning reactions. This adverse result may be avoided by selection of a proper catalyst, dilution of the catalyst with an inert material and/or a spreading out of the catalyst surface, e.g. by utilizing small diameter parallel tubes in a fixed bed catalyst or a fluidized catalyst bed. The utilization of excess $H_2S$ and/or hydrogen halide in the dimerization-dehydrogenation process is also desirable as a means of avoiding side reactions such as oxidation of the feedstocks, e.g. propylene to acrolein.

Both the catalyst and the support it is impregnated on are important variables. It has been found that the oxidation of $H_2S$ to form the reactive sulfur species requires a relatively low surface area material in the range of about 0.5 to 100 square meters per gram, preferably 4 to 12 square meters per gram. While somewhat lower surface areas may be employed the maximum conversions and selectivities to the desired dehydrogenated products are achieved within the above-disclosed surface area ranges. Suitable catalyst supports include alumina, magnesia, titania, silica and silica-alumina.

While reasonably high conversions may be effected when the above-disclosed catalytic supports are employed alone, the utilization of an additional catalyst to promote the dehydrogenation of the feedstock is desirable and represents a preferred embodiment of the invention. A wide variety of metal salts, oxides and hydroxides may be employed for this purpose. The oxides and hydroxides of Group I-A and II-A metals (of the Periodic Table) as well as the oxides and hydroxides of the Lanthanide series such as cerium have been found to be particularly effective catalysts for the process of this invention. In addition, elements representative of Groups II-B to VIII of the Periodic Table such as iron, uranium, zinc, nickel, manganese and molybdenum, may also be suitable catalysts for the novel process. The above-mentioned materials may be used either singly or in admixture with each other and in addition may be used with or without a catalyst support. When a support is used, the weight ratio of catalyst to support may vary from 0.001 to 1.0, preferably from 0.01 to 0.05.

The process of this invention is normally carried out in the presence of an inert diluent since the high temperatures of oxy-dehydrogenation reactions may be susceptible to explosion as well as cracking of the feedstock. Any inert diluent which may easily be separated from the reaction product is employable in the process of this invention. Typical examples of such materials are methane, waste gases containing methane and small quantities of other hydrocarbons, nitrogen, CO, $CO_2$, helium, $H_2S$ or mixtures of the above. The ratio of diluent to feed may vary over wide limits, e.g., 1 to 20 moles of diluent per mole of feed, preferably 4 to 10 moles of diluent per mole of feed.

The halogen promoters which are suitable for use in this improved process include any of the halogens, preferably chlorine, bromine, or iodine. These materials may be employed in the form of free halogens or in the form of halogen containing materials which liberate free halogens under the conditions of reaction. Typical examples of halogen liberating materials which are employable in the process include hydrochloric acid, hydrobromic acid and hydroiodic acid. In addition, halogen mixtures containing at least two of the above-described halogens or halogen liberating compounds may be advanatgeously employed in the process of this invention.

The reactant ratios are highly critical if optimum selectivities and conversions are to be achieved. Preferably at least 0.5 mole of oxygen is employed to produce a mole of S which in turn producers a mole of unsaturated product. Thus, where a mono-unsaturated product is desired the mole ratio of $O_2$ to feed is normally at least 0.5 to 1 and where a di-unsaturate is the desired reaction product the mole ratio of $O_2$ to feed is maintained at least 1 to 1. It will be understood, of course, that a limited excess of $O_2$ is permissible and may in some instances be desirable. Similarly, it is possible to effect partial conversions by utilizing less than the stoichiometric amount in some instances. Thus $O_2$ may be employed in 1 to 50% excess of the theoretically required amount, i.e. 0.5 to 0.75 moles of $O_2$ per mole of unsaturation in the reaction product and in some instances may be employed in amounts ranging from 0.25 to 0.5 moles $O_2$/mole of unsaturation.

The presence of the halogen or halogen liberating compound promoter serves to increase the formation of the active S species. Halogen concentrations varying between 0.001 and 5.0 moles per mole of hydrocarbon can be employed in the process of this invention depending upon the halogen selected. When iodine or bromine promoters are used the concentration of the latter never exceeds 1.0 mole per mole hydrocarbon. With chlorine promoters concentrations up to 5.0 moles may be employed. The mole ratio of $H_2S$ to $O_2$ is of equally critical importance in achieving high conversions and selectivities of desired unsaturated products. The reaction $H_2S + 1.5 O_2 \rightarrow SO_2 + H_2O$ is not desired since S and not $SO_2$ is the desired dehydrogenation intermediate. Thus, the mole ratio of $O_2$ to $H_2S$ should be maintained below 1.5:1, preferably 1:1. The utilization of excess amounts of $H_2S$ does not adversely effect the reaction and in fact is a suitable method of diluting the reaction mixture, particularly, as noted previously, when highly exothermic reactions are involved. $H_2S$ may be employed in diluent proportions either alone or in combination with other diluents disclosed therein. Thus, mole ratios of $O_2$ to $H_2S$ in the range of 1:1 to 1:10 or more represent a preferred embodiment of the invention.

The process of this invention is amenable to the utilization of $SO_2$ in lieu of $O_2$ for the oxidation of $H_2S$ in accordance with the following equation:

$$2H_2S + SO_2 \rightarrow 2H_2O + 3S$$

This reaction may be employed if the halogen used is present in the molecular form e.g. $I_2$, $Br_2$, $Cl_2$. If hydrogen halides or other halogen liberating compounds are used enough $O_2$ must be present to cause complete oxidation to the molecular halogen. The $H_2S:SO_2$ mole ratio employed may vary from 2/1 to 10/1, preferably from 2/1 to 5/1.

Reaction conditions are further important variables in the process of this invention. The relationship between temperature and both conversions and selectivities is critical since at low temperatures no appreciable reaction takes place while at high temperatures the organic feedstock is susceptible to oxidative attack and cracking. A suitable temperature for the process of this invention is about 800° to 1400° F., preferably 950° to 1250° F., e.g. 1000° F. The space velocity of reaction is dependent upon temperature, the higher temperatures requiring shorter contact times and thus may vary from 50 to 400 volumes of hydrocarbon feed per volume of catalyst per hour, preferably 100 to 300 v./v./hr., e.g. 200 v./v./hr. Reaction pressure is not critical and a wide range of pressures from atmospheric to 30 or more atmospheres may be successfully employed in the process.

In a typical process scheme the gaseous reactants in the ratios described above are heated to the desired temperature in a furnace and then fed to a reactor containing the oxidative dehydrogenation catalyst in either a fixed or fluidized condition so that the $H_2S/O_2/$ halogen/hydrocarbon reactions take place, as disclosed, to give high yields of the more unsaturated hydrocarbon product. The reactor effluent is then quenched with water to cool the hot product gases and dissolve the halogens or the hydrogen halides and, for example, in the case of the production of butadiene from butene or butane, compressed to at least 40 p.s.i.g., cooled to 35° F. and the $C_4$ hydrocarbons separated from the reaction products by adsorption in a $C_8$ paraffin stream. The $H_2S$ (together with $CO_2$ and some light hydrocarbons) is recycled to the reaction system. Hydrogen halides and halogens recovered from the quench water may also be recycled. The $C_4$ hydrocarbons are distilled from the heavy paraffin stream and the butadiene separated from the unreacted butene or butane. The latter can be heated and recycled to the reaction. It should be emphasized that any convenient processing scheme can be used to separate hydrocarbons in the reactor effluent gas from the $H_2S$ and halogen compounds. The exact processing steps will, of course, depend on the type of hydrocarbons involved and their molecular weight. The $C_4$ example is offered only as an illustration of the process scheme of this invention. It should also be noted that the oxidative dehydrogenation technique using sulfur ($H_2S$) and halogen promoters is an exothermic process. Thus, any of the techniques designed to prevent the formation of a temperature buildup in the catalyst bed, e.g. catalyst dilution with low surface area inert material or the "spreading out" of the catalyst in a large number of small diameter, parallel, fixed bed tubes or fluid bed techniques, can be employed with advantage.

The invention will be further understood by reference to the following illustrative examples.

EXAMPLE 1

The effect of the presence of HCl and different metal oxides on the dehydrogenation of butane was studied by passing a mixture of n-$C_4H_{10}$/$H_2S$/$O_2$/He in the mole ratio 1/3.5/1.25/10 containing either 0 or 1.0 mole HCl per mole butane over various metal oxide-alundum catalysts at 1025° F. and 200 vol. butene/vol. catalyst/hr.

space velocity. The results are summarized in Table I below:

TABLE I

| Run No. | 5% metal oxide on alundum catalyst | HCl present | Percent butane conversion | Percent selectivity to— | | Percent yield of— | | $C_4H_6/C_4H_8$ ratio in product |
|---|---|---|---|---|---|---|---|---|
| | | | | $C_4H_8$ | $C_4H_6$ | $C_4H_8$ | $C_4H_6$ | |
| 151 | $Ni_2O_3$ | No | 33.8 | 38.2 | 13.4 | 12.9 | 4.5 | 0.35 |
| 152 | $Ni_2O_3$ | Yes | 33.4 | 38.8 | 2.7 | 13.0 | 0.9 | 0.07 |
| 165 | $U_3O_8$ | No | 29.1 | 23.9 | 24.0 | 6.9 | 7.0 | 1.01 |
| 166 | $U_3O_8$ | Yes | 34.7 | 23.4 | 37.7 | 8.1 | 13.1 | 1.62 |
| 145 | $La_2O_3$ | No | 36.8 | 24.4 | 9.9 | 9.0 | 3.6 | 0.40 |
| 146 | $La_2O_3$ | Yes | 36.3 | 21.3 | 32.4 | 7.8 | 11.8 | 1.51 |
| 171 | $CeO_2$ | No | 28.7 | 22.8 | 13.4 | 6.5 | 3.8 | 0.59 |
| 172 | $CeO_2$ | Yes | 29.6 | 23.2 | 47.9 | 6.8 | 14.2 | 2.09 |

The results show the marked effect the addition of hydrogen chloride can have on the butadiene yields and hence on the butadiene/butene ratio of the product gas. This effect is, of course, influenced to a large degree by the metal oxide used to catalyze the reaction. Thus, cerium, lanthanum and uranium oxides allowed high butadiene yields to be obtained while nickel oxide actually caused a decrease in the butadiene production on the addition of one mole of HCl per mole of butane fed to the reactor.

EXAMPLE 2

The effect of the presence of HCl in ethylbenzene dehydrogenation was studied by passing a mixture of $C_6H_5C_2H_5/O_2$/helium in the mole ratio 1/0.6/9 over a 25 m.$^2$/g. alumina catalyst at an ethylbenzene space velocity of 0.6 w./w./hr. The results obtained are summarized in Table II below:

TABLE II

| Run No. | Moles/mole ethylbenzene in feed mixture | | Reaction temperature, °F. | Ethylbenzene conversion, percent | Selectivity to styrene, percent | Styrene yield, percent |
|---|---|---|---|---|---|---|
| | $H_2S$ | HCl | | | | |
| M-53 | | | 1,100 | 40.9 | 70.9 | 29.4 |
| M-56 | | 0.6 | 1,100 | 44.6 | 36.8 | 16.3 |
| M-59 | 0.6 | | 1,100 | 54.7 | 80.2 | 43.9 |
| M-62 | 0.6 | 0.6 | 1,100 | 89.6 | 75.3 | 67.5 |
| M-60 | 0.6 | | 1,150 | 80.6 | 87.6 | 71.6 |
| M-63 | 0.6 | 0.6 | 1,150 | 88.2 | 80.0 | 70.6 |

The results in the above table shows that HCl addition not only causes an increase in ethylbenzene conversion but also allows high styrene yields to be obtained at lower temperatures when $H_2S$ is present in the reaction feed mixture.

EXAMPLE 3

The effect of the presence of HCl in butene dehydrogenation was studied by passing a mixture of $$1\text{-}C_4H_8/O_2/He$$

in mole ratio 1/0.6/10 over a wide range of catalysts having a variety of surface areas and under a wide range of conditions. The results are summarized in Table III below:

TABLE III

| | Run No. | | | | | | |
|---|---|---|---|---|---|---|---|
| | 32 | 33 | 31 | 38 | 42 | | |
| Catalyst | 15% $CeO_2/Al_2O_3$ S.A. 11$^2$m.$^2$/g. | | | 5% $CeO_2/Al_2O_3$ S.A. 1 m$^2$/g. | | 5% $CaO/Al_2O_3$ S.A. 1 m$^2$/g. | |
| Temperature, °F | 1,200 | 1,200 | 1,200 | 1,060 | 1,060 | 1,200 | 1,200 |
| Space Velocity, v./v./hr | 200 | 200 | 200 | 150 | 150 | 150 | 150 |
| $H_2S$, moles/mole $C_4H_8$ | 1.5 | 0 | 1 | 1 | 1 | 1 | 1 |
| HCl, moles/mole $C_4H_8$ | 0 | 1.5 | 0.5 | 0 | 1 | 0 | 1 |
| Percent Conversion of $C_4H_8$ | 64.5 | 44.7 | 61.5 | 74.5 | 58.4 | 77.8 | 62.5 |
| Percent Selectivity to $C_4H_6$ | 72.5 | 60.1 | 77.1 | 75.3 | 88.1 | 66.7 | 85.3 |
| Percent Yield $C_4H_6$ | 46.8 | 26.8 | 47.5 | 56.1 | 51.4 | 51.6 | 53.2 |

The results clearly indicate that the utilization of a combined $H_2S+HCl$ dehydrogenation system results in higher selectivities for the formation of the desired di-unsaturated compound than either the $H_2S$ system alone or an HCl system used alone.

EXAMPLE 4

The effect of temperature variations on butene dehydrogenation was determined by passing the feed mixture of $1\text{-}C_4H_8/H_2S/HCl/O_2He$ in mole ratio 1/1/1/0.75/10 over a catalyst bed of 15 wt. percent of $CeO_2$ on $Al_2O_3$ (surface area equal 11 m.$^2$/gm.) at atmospheric pressure and a space velocity of 150 v./v./hr. The results are summarized in Table IV below:

TABLE IV

| Run No | P 5 | P 7 | P 18 |
|---|---|---|---|
| Temperature, °F | 1,060 | 1,200 | 1,250 |
| Percent Conversion of $C_4H_8$ | 57.1 | 65.0 | 84.5 |
| Percent Selectivity to $C_4H_6$ | 92.1 | 86.9 | 56.8 |
| Percent Yield $C_4H_6$ | 52.5 | 56.4 | 47.9 |

The results in Table IV clearly indicate the criticality of the temperature on yields of unsaturated product.

EXAMPLE 5

The effect of space velocity on butene dehydrogenation was determined by passing the feed mixture of $1\text{-}C_4H_8/H_2S/HCl/O_2He$ in mole ratio 1/1/1/0.75/10 over a fixed bed catalyst of 15% $CeO_2$ on 11 m.$^2$/gm. $Al_2O_3$ at atmospheric pressure. The results are summarized in Table V below:

TABLE V

| Run No | P 17 | P 18 | P 19 | P 20 | P 21 | P 7 | P 26 | P 8 |
|---|---|---|---|---|---|---|---|---|
| Space Velocity, v./v./hr | 100 | 150 | 200 | 250 | 300 | 150 | 200 | 300 |
| Temperature, °F | 1,250 | 1,250 | 1,250 | 1,250 | 1,250 | 1,200 | 1,200 | 1,200 |
| Percent Conversion $C_4H_8$ | 82.4 | 84.5 | 88.5 | 94.2 | 69.5 | 65.0 | 72.1 | 49.5 |
| Percent Selectivity to $C_4H_6$ | 52.2 | 56.8 | 64.5 | 60.8 | 71.5 | 86.9 | 74.1 | 87.5 |
| Percent Yield of $C_4H_6$ | 42.9 | 47.9 | 57.0 | 57.8 | 51.8 | 56.4 | 53.5 | 43.3 |

It will be understood that many modifications may be made to the process described herein without departing from the spirit of the invention. Having pointed out the general nature as well as specific embodiments of the in-

What is claimed is:

1. A process for producing an unsaturated organic compound from an organic feedstock having 2 to 20 carbon atoms and containing at least one

group which comprises a vapor phase reaction of said feedstock at a temperature in the range of 800° to 1400° F. with at least 0.25 mole of oxygen per mole of feed, at least 0.5 mole of $H_2S$ per mole of oxygen and at least 0.001 mole of at least one halogen material per mole of said feed said halogen being selected from the group consisting of free halogens and hydrogen halides.

2. The process of claim 1 wherein the reaction is carried out in the presence of 1 to 20 moles per mole of organic feed of an inert diluent.

3. The process of claim 2 wherein said organic feedstock is butane.

4. The process of claim 2 wherein said organic feedstock is ethylbenzene and the unsaturated product is styrene.

5. The process of claim 2 wherein said organic feedstock is propylene and the unsaturated organic products are cyclohexene and benzene.

6. The process of claim 2 wherein 0.25 to 0.75 mole of oxygen per mole of feed, 0.001 to 5.0 moles of halogen per mole of feed and 1.0 to 10.0 moles of $H_2S$ per mole of oxygen are employed in the reaction.

7. The process of claim 2 wherein said reaction is carried out in the presence of a catalyst selected from the group consisting of oxides and hydroxides of metals selected from Groups I to VIII of the Periodic Table.

8. The process of claim 7 wherein said catalyst is supported on a material selected from the group consisting of alumina, magnesia, titania, silica and silica-alumina.

9. A process for producing an unsaturated organic compound from an organic feedstock having 2 to 20 carbon atoms and containing at least one

group which comprises a vapor phase reaction of said organic feedstock at a temperature in the range of 800° to 1400° F. with 0.25 to 0.75 mole of oxygen per mole of feed, 0.5 to 10 moles of $H_2S$ per mole of oxygen and 0.001 to 5.0 moles per mole of feed of a halogen containing material selected from the group consisting of free halogens and hydrogen halides, in the presence of a catalyst selected from the group consisting of oxides and hydroxides of metals selected from Groups I to VIII of the Periodic Table and 1 to 20 moles per mole of feed of an inert diluent.

10. The process of claim 9 wherein said catalyst is selected from the group consisting of oxides and hydroxides of nickel, uranium, lanthanum, cerium and calcium.

11. The process of claim 9 wherein said catalyst is supported on a material selected from the group consisting of alumina, magnesia, titania, silica and silica-alumina.

12. The process of claim 9 wherein the halogen promoter is selected from the group consisting of $Br_2$, $I_2$, HBr and HI and the molar ratio of halogen to feed is in the range of 0.001 to 1.0 mole of halogen/mole of feed.

13. The process of claim 9 wherein the halogen promoter is selected from the group consisting of $Cl_2$ and HCl.

14. A process for producing a relatively more highly unsaturated hydrocarbon from a relatively less highly unsaturated hydrocarbon which comprises a vapor phase reaction of a $C_2$ to $C_8$ hydrocarbon at a temperature of 950° to 1250° F. with 0.25 to 0.75 mole of oxygen per mole of feed, 0.5 to 10 moles of $H_2S$ per mole of oxygen and 0.001 to 1.0 mole of halogen containing material per mole of feed said halogen being selected from the group consisting of free halogen and hydrogen halide, in the presence of a catalyst selected from the group consisting of oxides and hydroxides of metals selected from Groups I to VIII of the Periodic Table.

15. The process of claim 14 wherein the hydrocarbon feed is butane and the unsaturated products are butene and butadiene.

16. The process of claim 14 wherein the hydrocarbon feed is ethylbenzene and the unsaturated product is styrene.

17. The process of claim 14 wherein the hydrocarbon feed is propylene and the unsaturated product comprises benzene.

18. A process for producing an unsaturated organic compound from an organic feed stock having 2 to 20 carbon atoms and containing at least one

group which comprises a vapor phase reaction of said organic feed stock at a temperature in the range of 800° to 1400° F. with at least 0.3 mole of $SO_2$ per mole of feed, $H_2S$ in amounts sufficient such that the molar ratio of $H_2S$ to $SO_2$ is in the range from about 2/1 to 10/1 and 0.001 to 5.0 moles per mole of feed of free molecular halogen in the presence of a catalyst selected from the group consisting of oxides and hydroxides of metals selected from Groups I to VIII of the Periodic Table and 1 to 20 moles per mole of feed of an inert diluent.

References Cited

UNITED STATES PATENTS

| | | | |
|---|---|---|---|
| 2,315,499 | 4/1943 | Cantzler et al. | 260—683.3 |
| 2,370,707 | 3/1945 | Archibald | 208—134 |
| 3,179,707 | 4/1965 | Lee | 260—669 |
| 3,247,278 | 4/1966 | Garwood | 260—683.3 |
| 3,306,942 | 2/1967 | Lee | 260—669 |
| 3,306,950 | 2/1967 | Bajars | 260—680 |

DELBERT E. GANTZ, *Primary Examiner.*

V. O'KEEFE, *Assistant Examiner.*